(12) United States Patent
Mene et al.

(10) Patent No.: US 12,548,205 B2
(45) Date of Patent: Feb. 10, 2026

(54) WHAT-IF SCENARIO BASED AND GENERATIVE ADVERSARIAL NETWORK GENERATED DESIGN ADAPTATION

(71) Applicant: International Business Machines Corporation, Armonk, NY (US)

(72) Inventors: Atul Mene, Morrisville, NC (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 17/659,024

(22) Filed: Apr. 13, 2022

(65) Prior Publication Data
US 2023/0334720 A1    Oct. 19, 2023

(51) Int. Cl.
*G06T 11/00* (2006.01)
*G06N 3/042* (2023.01)
*G06N 3/045* (2023.01)

(52) U.S. Cl.
CPC .............. *G06T 11/00* (2013.01); *G06N 3/042* (2023.01); *G06N 3/045* (2023.01); *G06T 2200/24* (2013.01)

(58) Field of Classification Search
CPC ..... G06T 11/00; G06T 2200/24; G06N 3/042; G06N 3/045; G06N 3/0475; G06N 3/088
See application file for complete search history.

(56) References Cited

U.S. PATENT DOCUMENTS

| 10,628,931 | B1 | 4/2020 | Ramos |
| 2020/0280730 | A1 | 9/2020 | Wang |
| 2021/0042110 | A1 | 2/2021 | Basyrov |

(Continued)

FOREIGN PATENT DOCUMENTS

CN    111091151 A    5/2020

OTHER PUBLICATIONS

Disclosed Anonymously, "UI Theme auto generator based on semantics and user's characteristics", an IP.com Prior Art Database Technical Disclosure, IP.com No. IPCOM000262967D, IP.com Electronic Publication Date: Jul. 17, 2020, 3 pages.

(Continued)

*Primary Examiner* — Jianxun Yang
(74) *Attorney, Agent, or Firm* — Kelsey M. Skodje (57) ABSTRACT

A computer-implemented method, a computer program product, and a computer system for design adaptation. One or more computing devices receive images provided by a user, receive form a designer one or more designer provided what-if scenarios of a design related to the images, receive form the user one or more user selected what-if scenarios from the one or more designer provided what-if scenarios, and retrieve information about influencing factors form an artificial intelligence (AI) knowledge corpus, where the influencing factors affect qualities of the images. One or more computing devices input the retrieved information into a generative adversarial network (GAN) module. One or more computing devices change the images by the GAN module to generate adapted images for the one or more user selected what-if scenarios, based on the retrieved information.

18 Claims, 6 Drawing Sheets

(56) References Cited

U.S. PATENT DOCUMENTS

| | | |
|---|---|---|
| 2021/0042882 A1 | 2/2021 | Kim |
| 2021/0209464 A1* | 7/2021 | Bala .................. G06F 18/23213 |
| 2021/0365614 A1 | 11/2021 | Sun |
| 2024/0220775 A1* | 7/2024 | Nishikawa ............. G06N 3/045 |

OTHER PUBLICATIONS

Gajjar et al., "Akin: Generating UI Wireframes from UI Design Patterns Using Deep Learning", IUI '21 Companion, Apr. 14-17, 2021, College Station, TX, USA, @ 2021 Copyright held by the owner/author(s), ACM ISBN 978-1-4503-8018-Aug. 21, 04, 3 pages.

Huang, et al., "Creating User Interface Mock-ups from High-Level Text Descriptions with Deep-Learning Models," arXiv:2110.07775v1 [cs.HC] Oct. 14, 2021, 20 pages.

Lei, Nin, "Generative Adversarial Network technology: AI goes mainstream", Generative Adversarial Network Technology, Sep. 17, 2019, 4 pages, <https://www.IBM.com/blogs/systems/generative-adversarial-network-technology-ai-goes-mainstream/>.

Mell et al., "The NIST Definition of Cloud Computing", NIST National Institute of Standards and Technology U.S. Department of Commerce, Special Publication 800-145, Sep. 2011, 7 pages.

Nguyen et al., "Deep Learning UI Design Patterns of Mobile Apps", 2018 IEEE/ACM 40th International Conference on Software Engineering: New Ideas and Emerging Results. ICSE-NIER'18, May 27-Jun. 3, 2018, Gothenburg, Sweden, © 2018 Association for Computing Machinery, ACM ISBN 978-1-4503-5662-6/18/05, 4 pages.

* cited by examiner

WHAT-IF SCENARIO BASED AND GENERATIVE ADVERSARIAL NETWORK GENERATED DESIGN ADAPTATION

BACKGROUND

The present invention relates generally to user interface or product design, and more particularly to what-if scenario based and generative adversarial network (GAN) generated design adaptation.

A generative adversarial network (or GAN) is generative modeling using deep learning methods, such as convolutional neural networks. Generative modelling is an unsupervised learning task in machine learning, and it involves automatically discovering and learning the regularities or patterns in input data to generate or output new samples that plausibly may have been drawn from the original dataset. GAN is a clever way of training a generative model by framing the problem as a supervised learning problem with two sub-models: the generator model and the discriminator model. The generator model are trained to generate new samples. The discriminator model tries to classify samples as either real (from the domain) or fake (generated). The two sub-models are trained together in a zero-sum game, adversarial, until the discriminator model is fooled about half the time which means the generator model generates plausible samples.

Analysis of a what-if scenario is a scenario-based analysis. When a what-if scenario is selected, the analysis outcome is changed based on the selected what-if scenario. When one or more what-if scenarios can be selected, accordingly analysis outcome also change. Different what-if scenarios may bring different influencing factors, and they need to be accommodated in prototype design.

SUMMARY

In one aspect, a computer-implemented method for what-if scenario based and generative adversarial network (GAN) generated design adaptation is provided. The computer-implemented method includes receiving images provided by a user. The computer-implemented method further includes receiving, form a designer, one or more designer provided what-if scenarios of a design related to the images. The computer-implemented method further includes receiving, form the user, one or more user selected what-if scenarios from the one or more designer provided what-if scenarios. The computer-implemented method further includes retrieving, form an artificial intelligence (AI) knowledge corpus, information about influencing factors for the one or more user selected what-if scenarios, wherein the influencing factors affect qualities of the images. The computer-implemented method further includes inputting the information about the influencing factors into a GAN module. The computer-implemented method further includes changing the images by the GAN module to generate adapted images for the one or more user selected what-if scenarios, based on the information about the influencing factors.

In another aspect, a computer program product for what-if scenario based and generative adversarial network (GAN) generated design adaptation is provided. The computer program product comprises a computer readable storage medium having program instructions embodied therewith, and the program instructions are executable by one or more processors. The program instructions are executable to: receive images provided by a user; receive, form a designer, one or more designer provided what-if scenarios of a design related to the images; receive, form the user, one or more user selected what-if scenarios from the one or more designer provided what-if scenarios; retrieve, form an artificial intelligence (AI) knowledge corpus, information about influencing factors for the one or more user selected what-if scenarios, wherein the influencing factors affect qualities of the images; input the information about the influencing factors into a GAN module; and change the images by the GAN module to generate adapted images for the one or more user selected what-if scenarios, based on the information about the influencing factors.

In yet another aspect, a computer system for what-if scenario based and generative adversarial network (GAN) generated design adaptation is provided. The computer system comprises one or more processors, one or more computer readable tangible storage devices, and program instructions stored on at least one of the one or more computer readable tangible storage devices for execution by at least one of the one or more processors. The program instructions are executable to receive images provided by a user. The program instructions are further executable to receive, form a designer, one or more designer provided what-if scenarios of a design related to the images. The program instructions are further executable to receive, form the user, one or more user selected what-if scenarios from the one or more designer provided what-if scenarios. The program instructions are further executable to retrieve, form an artificial intelligence (AI) knowledge corpus, information about influencing factors for the one or more user selected what-if scenarios, where the influencing factors affect qualities of the images. The program instructions are further executable to input the information about the influencing factors into a GAN module. The program instructions are further executable to change the images by the GAN module to generate adapted images for the one or more user selected what-if scenarios, based on the information about the influencing factors.

DETAILED DESCRIPTION

A generative adversarial network (or GAN) is used for generating images or a sequence of images. When the images or sequence of images are generated with a GAN, various contextual situation may be considered to visualize the changes in base images, and then a user has to decide whether the images or sequence of images are to be adapted with identified what-if scenarios. For example, the images or a sequence of images may be required for creating a prototype of a user interface in a mobile device or a visual look of a product (such as a vehicle). Embodiments of the present invention provide a solution for a dynamic ameliorative user interface design or product design.

Embodiments of the present invention provide what-if scenario selection for user experience. While designing a user interface of a mobile device or a visual look of a product, a user may select one or more what-if scenarios. Accordingly, based on the selected what-if scenarios, a GAN module of the proposed system adapts images of the user interface or the visual look of the product.

Embodiments of the present invention provide artificial intelligence (AI) adaption for user experience design. Based on selection of one or more what-if scenarios, AI enabled module of the proposed system identifies influencing factors that are associated with the what-if scenarios, and the influencing factors are considered by the GAN module to adapt the images.

Embodiments of the present invention consider multiple factors associated with selection of multiple what-if scenarios. If multiple what-if scenarios are selected, then the proposed system identifies aggregated influencing factors from the selected what-if scenarios. Accordingly, the GAN enabled module adapts the images with the aggregated influencing factors.

Embodiments of the present invention provide spoken commands. During the designing, a user may select one or more what-if scenarios with spoken commands and accordingly the proposed system identifies the influencing factors for those what-if scenarios selected by the spoken commands.

Embodiments of the present invention provide a supporting knowledge corpus and historical data infusion. The proposed system gathers various historical what-if scenarios from structured document analysis, image analysis, or any manually creation of rules. The proposed system creates a knowledge corpus with different influencing factors and the what-if scenarios.

Figure 1:
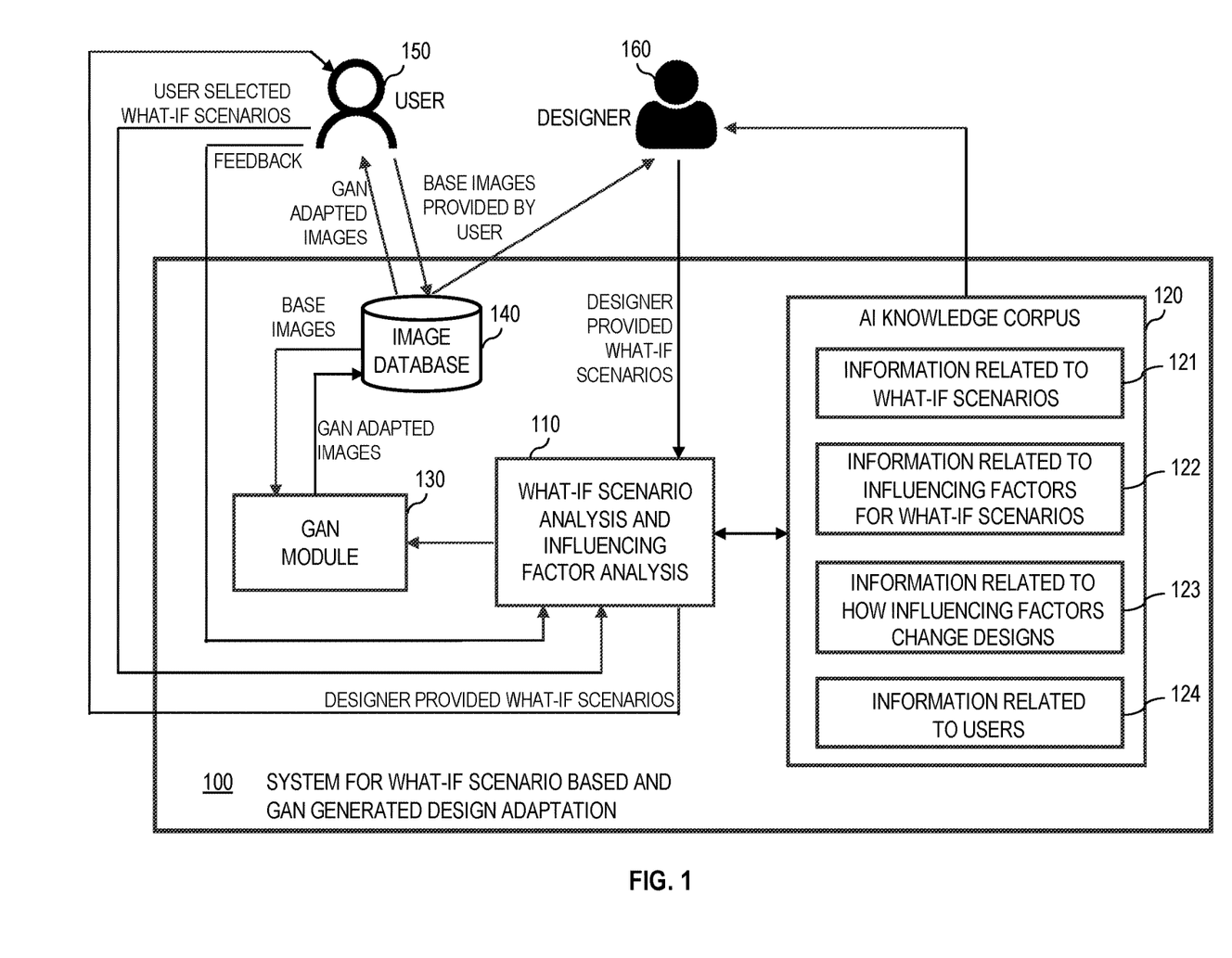
FIG. 1 is a systematic diagram illustrating a system for what-if scenario based and GAN generated design adaptation, in accordance with one embodiment of the present invention.

FIG. 1 is a systematic diagram illustrating system 100 for what-if scenario based and GAN generated design adaptation, in accordance with one embodiment of the present invention. System 100 is implemented on one or more computing devices or servers. A computing device or server is described in more detail in later paragraphs with reference to FIG. 4. System 100 may be implemented in a cloud computing environment. The cloud computing environment is described in more detail in later paragraphs with reference to FIG. 5 and FIG. 6.

System 100 includes module 110 for what-if scenario analysis and influencing factor analysis, AI knowledge corpus 120, GAN module 130, and image database 140. User 150 provides base images to image database 140 in system 100. Designer 160 provides one or more what-if scenarios, based on the base images stored on image database 140 and information in AI knowledge corpus 120 which has historical data about what-if scenarios. User 150 selects one or more what-if scenarios from the one or more designer provided what-if scenarios.

Module 110 for what-if scenario analysis and influencing factor analysis receives the one or more what-if scenarios provided by designer 160. Module 110 sends the one or more user provided what-if scenarios to a device of user 150 and thus user 150 selects one or more what-if scenarios from the one or more user provided what-if scenarios. Module 110 further receives from user 150 the one or more user selected what-if scenarios.

Module 110 retrieve information from AI knowledge corpus 120. The information on AI knowledge corpus 120 includes information 121 related to what-if scenarios. The information on AI knowledge corpus 120 further includes information 122 related to influencing factors for what-if scenarios. The information on AI knowledge corpus 120 further includes information 123 related to how influencing factors change designs. The information on AI knowledge corpus 120 further includes information 124 related to users; for example, AI knowledge corpus 120 may include information about the user's preferences of designs for user 150.

Module 110 feeds, to GAN module 130, the one or more user selected what-if scenarios and the retrieved information. The information fed to GAN module 130 includes information about the one or more user selected what-if scenarios. The information fed to GAN module 130 further includes influencing factors for the one or more user selected what-if scenarios. The influencing factors are factors or parameters that affect qualities of the images. For example, an influencing factor may be color adjustment of a photo or image. The information fed to GAN module 130 further includes about how influencing factors change the one or more user selected what-if scenarios. The information fed to GAN module 130 further includes information about user 150, such as user's preferences of the designs (e.g., designs of a user interface on a mobile device or a visual look of a product).

GAN module 130 uses the base images as input to generate GAN adapted images. In one embodiment shown in FIG. 1, GAN module 130 gets the base images from image database 140. In another embodiment, GAN module 130 may get the base images directly form a device of user 150. GAN module 130 changes the base images or visual looks for the one or more user selected what-if scenarios to generate GAN adapted images, based on the information retrieved from the AI knowledge corpus. In one embodiment shown in FIG. 1, GAN module 130 stores the GAN adapted images to image database 140. In another embodiment, GAN module 130 may send the GAN adapted images directly to a device of user 150.

User 150 reviews the user selected one or more what-if scenarios with the GAN adapted images. User 150 may be satisfied with the user selected one or more what-if scenarios. User 150 sends feedback to module 110 in system 100. In response to receiving satisfactory feedback from user 150, module 110 will update AI knowledge corpus with positive feedback. In response to receiving unsatisfactory feedback from user 150, module 110 will update AI knowledge corpus with negative feedback. In one case, in response to receiving unsatisfactory feedback from user 150, module 110 may inform designer 160 to change designs and provide new what-if scenarios, and then module 110 may inform user 150 to select one or more scenarios from the new designer provided what-if scenarios; upon receiving user newly selected what-if scenarios, module 110 and GAN module 130 will repeat the process to generate GAN adapted images for the user newly selected what-if scenarios. In another case, in response to receiving unsatisfactory feedback from user 150, module 110 may inform user 150 to re-select one or more scenarios from the designer provided what-if scenarios, and module 110 and GAN module 130 will repeat the process to generate GAN adapted images for the user re-selected what-if scenarios.

Figure 2:
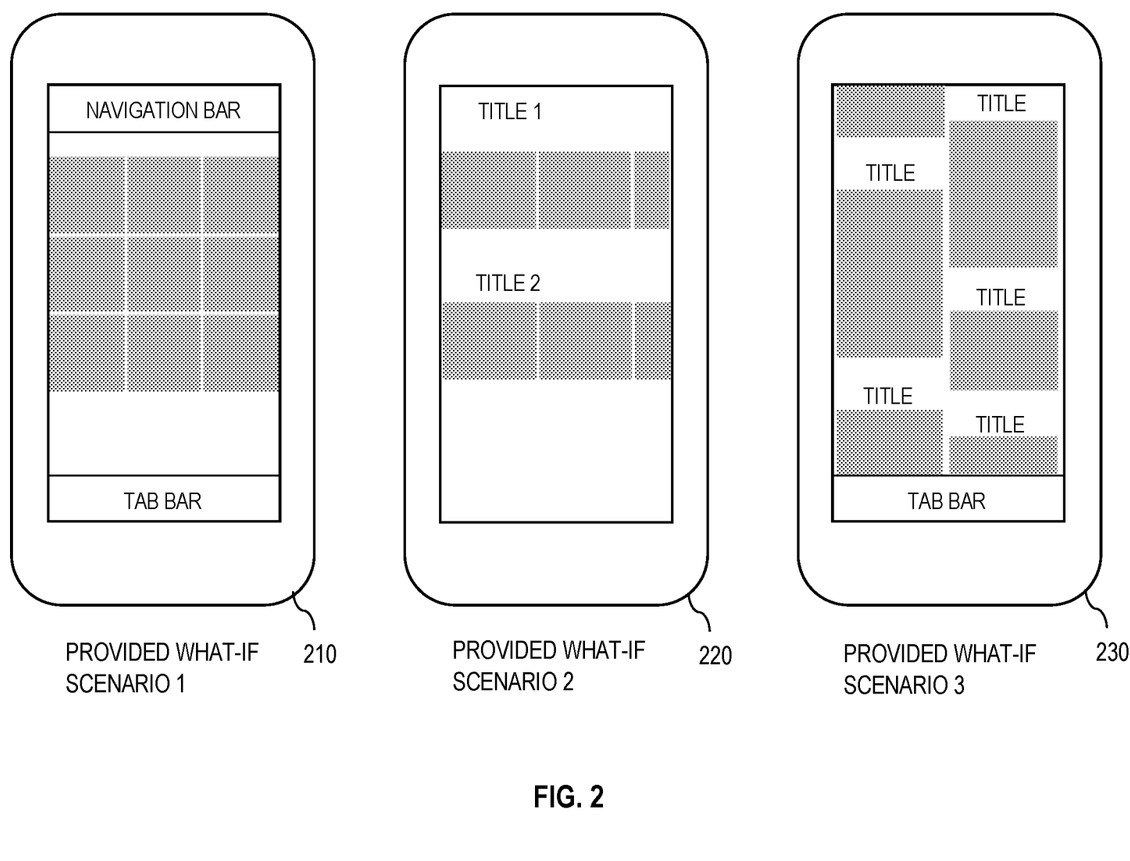
FIG. 2 is a diagram illustrating a use case of what-if scenarios for a design of a photo-based menu on a mobile device, in accordance with one embodiment of the present invention.

FIG. 2 is a diagram illustrating a use case of what-if scenarios for a design of a photo-based menu on a mobile device, in accordance with one embodiment of the present invention. As an example, three what-if scenarios (namely provided what-if scenario 1 210, provided what-if scenario 2 220, and provided what-if scenario 3 230) for a design of a photo-based menu on a mobile device are illustrated. The three what-if scenarios are provided by a designer based on user's base photos and information from an AI knowledge corpus. For example, a user selects one what-if scenario from the three what-if scenarios. The user selected what-if scenario will be inputted into the proposed system for what-if scenario based and GAN generated user interface adaptation.

Figure 3:
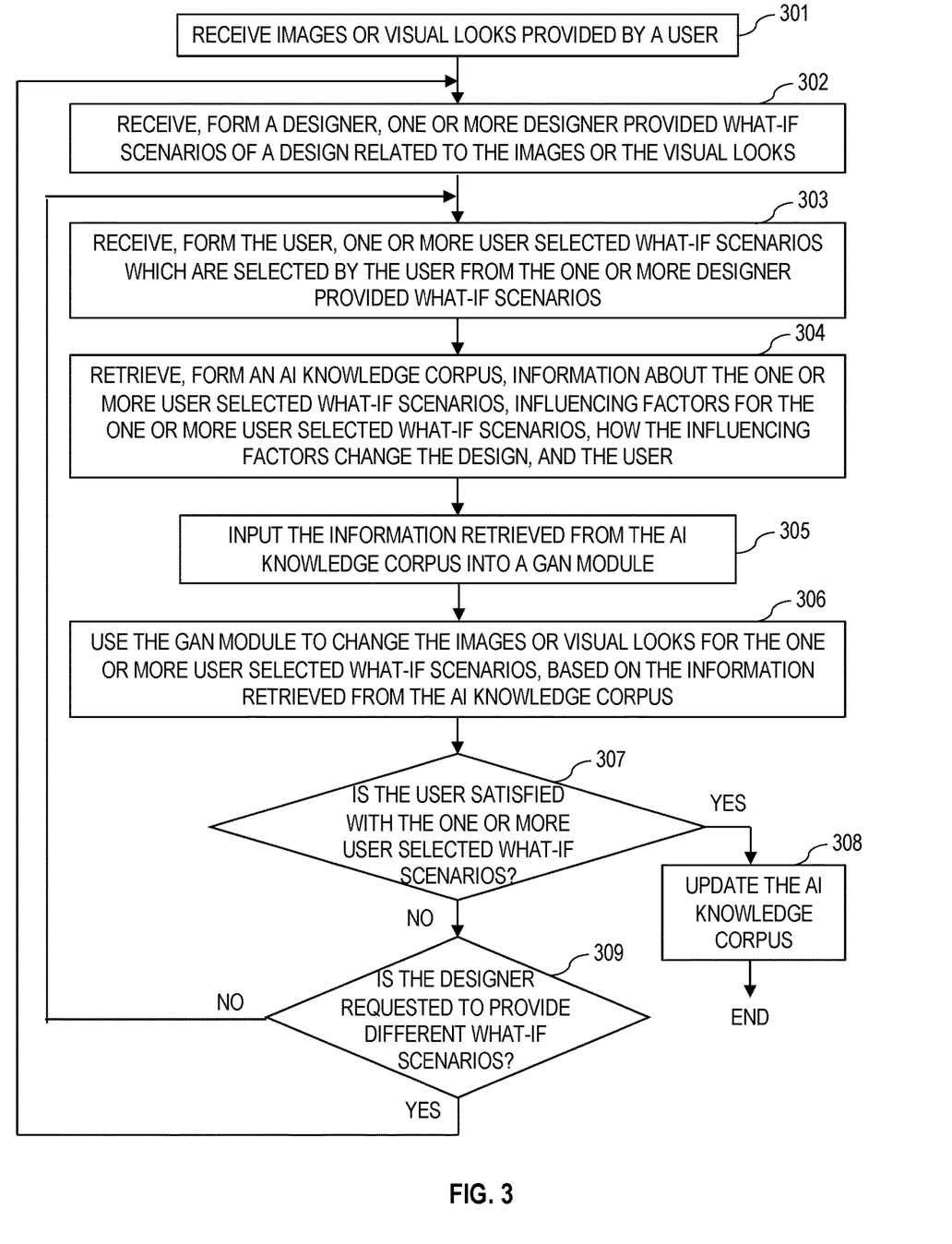
FIG. 3 is a flowchart showing operational steps of what-if scenario based and GAN generated design adaptation, in accordance with one embodiment of the present invention.

FIG. 3 is a flowchart showing operational steps of what-if scenario based and GAN generated design adaptation, in accordance with one embodiment of the present invention. The operational steps are implemented on one or more computing devices or servers. A computing device or server is described in more detail in later paragraphs with reference to FIG. 4. The operational steps may be implemented in a cloud computing environment. The cloud computing environment is described in more detail in later paragraphs with reference to FIG. 5 and FIG. 6.

At step 301, the one or more computing devices or servers receive images or visual looks provided by a user. For example, the images are captured by the user with a user's device and may be stored on the user's device or in an image database on the one or more computing devices or servers. In the embodiment shown in FIG. 1, system 100 for what-if scenario based and GAN generated design adaptation receives from user 150 the base images or visual looks.

At step 302, the one or more computing devices or servers receive, form a designer, one or more designer provided what-if scenarios of a design related to the images or the visual looks. In the embodiment shown in FIG. 1, module 110 for what-if scenario analysis and influencing factor analysis in system 100 receives form designer 160 the one or more designer provided what-if scenarios; designer 160 provides the what-if scenarios, based on the images or visual looks provided by user 150 and information from AI knowledge corpus 120.

At step 303, the one or more computing devices or servers receive, form the user, one or more user selected what-if scenarios which are selected by the user from the one or more designer provided what-if scenarios. The one or more computing devices present to the user the one or more designer provided what-if scenarios, and then the user chooses the one or more user selected what-if scenarios from the one or more designer provided what-if scenarios. For example, shown in FIG. 2, in the use case of what-if scenarios for a design of a photo-based menu on a mobile device, the designer provides three what-if scenarios for a design, and the user may select one what-if scenario for the design of the photo-based menu on the mobile device. In the embodiment shown in FIG. 1, user 150 selects the one or more user selected what-if scenarios from the one or more designer provided what-if scenarios provided by designer 160.

At step 304, the one or more computing devices or servers retrieve, form an artificial intelligence (AI) knowledge corpus, information about the one or more user selected what-if scenarios, influencing factors for the one or more user selected what-if scenarios, how the influencing factors change the design, and the user. Upon receiving from the user the one or more user selected what-if scenarios, the one or more computing devices or servers retrieve information from the AI knowledge corpus, in order to analyze the one or more user selected what-if scenarios and influencing factors for the one or more user selected what-if scenarios. The influencing factors, such as color adjustment of a photo or image, affect qualities of the images. The one or more computing devices or servers further retrieve the information about the user, for example the user's preferences of the design. In the embodiment shown in FIG. 1, module 110 in system 100 retrieves the information form AI knowledge corpus 120 including information 121 related to what-if scenarios, information 122 related to influencing factors for what-if scenarios, information 123 related to how influencing factors change designs, and information 124 related to users.

At step 305, the one or more computing devices or servers input the information retrieved from the AI knowledge corpus into a generative adversarial network (GAN) module. At this step, the one or more computing devices or servers input the information retrieved at step 304 into the GAN module. In the embodiment shown in FIG. 1, module 110 in system 100 feeds retrieved information from AI knowledge corpus 120 into GAN module 130 in system 100.

At step 306, the one or more computing devices or servers use the GAN module to change the images or visual looks for the one or more user selected what-if scenarios, based on the information retrieved from the AI knowledge corpus. At this step, the GAN module uses the base images as input to generate GAN adapted images. The GAN adapted images are provided to the user by the one or more computing devices or servers. In the embodiment shown in FIG. 1, GAN module 130 in system 100 changes the images or visual looks for the one or more user selected what-if scenarios. In the embodiment shown in FIG. 1, GAN module 130 gets the base images from image database 140 and stores the GAN adapted images on image database 140, and then the device of user 150 retrieves the GAN adapted images stored on image database 140. In another embodiment, GAN module 130 gets the base images from a device of user 150 and sends the GAN adapted images to the device of user 150.

At step 307, the one or more computing devices or servers determine whether the user is satisfied with the one or more user selected what-if scenarios. After receiving the GAN adapted images, the user will send feedback on the one or more user selected what-if scenarios with the GAN adapted images. The user may provide either positive or negative feedback.

In response to determining that the user is satisfied with the one or more user selected what-if scenarios (YES branch of decision step 307), the one or more computing devices or servers update the AI knowledge corpus at step 308. In this case, the user provides positive feedback, and the one or more computing devices or servers update the AI knowledge corpus with the positive feedback.

In response to determining that the user is not satisfied with the one or more user selected what-if scenarios (NO branch of decision step 307), at step 309, the one or more computing devices or servers determine whether the designer is requested to provide different what-if scenarios (or one or more designer newly provided what-if scenarios). Further, the one or more computing devices or servers update the AI knowledge corpus with user's negative feedback.

In response to determining that the designer is requested to provide different what-if scenarios (YES branch of decision step 309), the one or more computing devices or servers iterate step 302. The one or more computing devices or servers receive from the designer the one or more designer newly provided what-if scenarios, and then one or more computing devices or servers receive from the user one or more user newly selected what-if scenarios. The one or more computing devices or servers iterate steps starting from step 302, until the user is satisfied with the one or more user newly selected what-if scenarios.

In response to determining that the designer is not requested to provide different what-if scenarios (NO branch of decision step 309), the one or more computing devices or servers iterate step 303. The one or more computing devices or servers receive from the user one or more re-selected what-if scenarios which are re-selected from the one or more designer provided what-if scenarios. With the one or more user re-selected what-if scenarios, the one or more computing devices or servers iterate steps starting from step 303, until the user is satisfied with the one or more user re-selected what-if scenarios.

Figure 4:
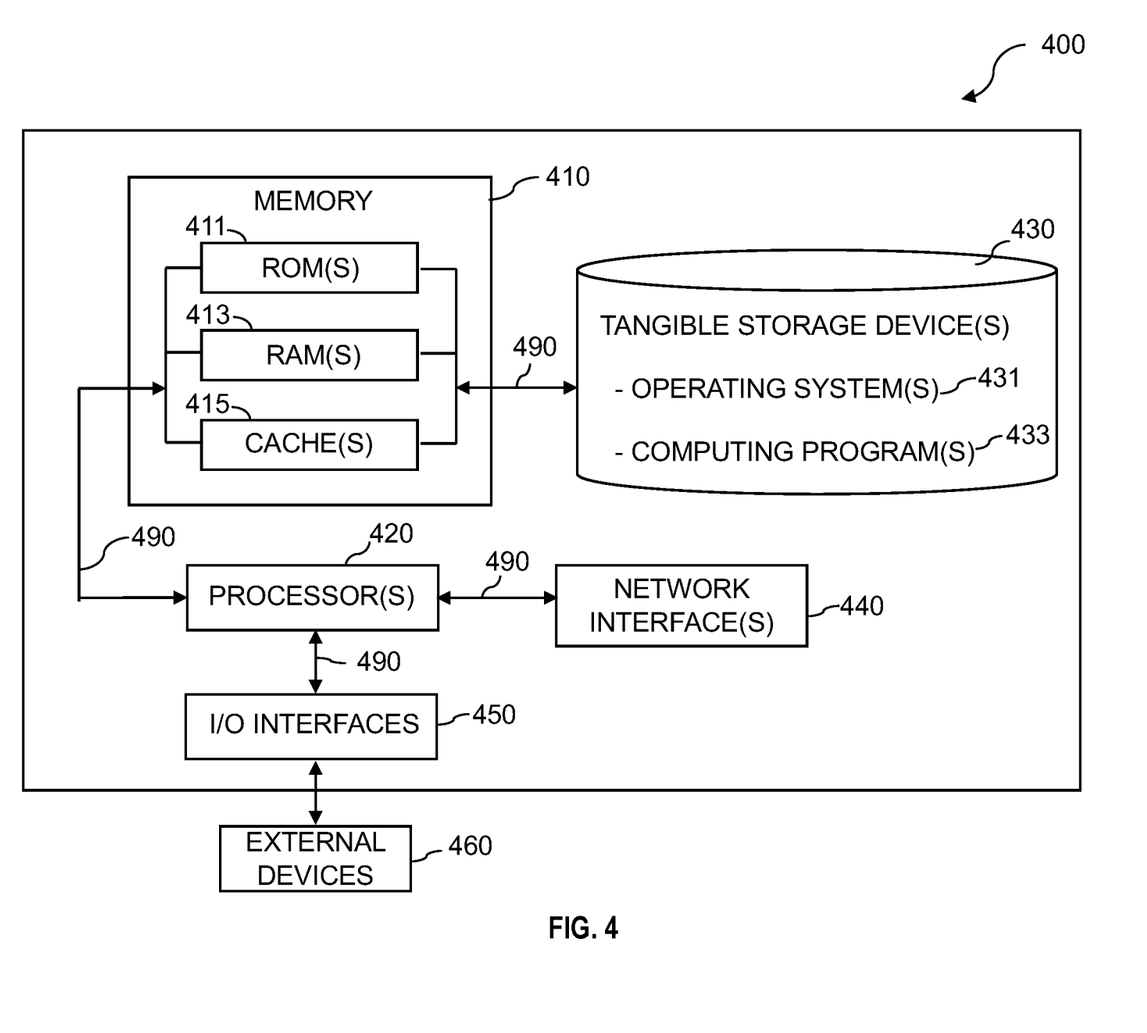
FIG. 4 is a diagram illustrating components of a computing device or server, in accordance with one embodiment of the present invention.

FIG. 4 is a diagram illustrating components of computing device or server 400, in accordance with one embodiment of the present invention. It should be appreciated that FIG. 4 provides only an illustration of one implementation and does not imply any limitations; different embodiments may be implemented.

Referring to FIG. 4, computing device or server 400 includes processor(s) 420, memory 410, and tangible storage device(s) 430. In FIG. 4, communications among the above-mentioned components of computing device or server 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430.

Computing device or server 400 further includes I/O interface(s) 450. I/O interface(s) 450 allows for input and output of data with external device(s) 460 that may be connected to computing device or server 400. Computing device or server 400 further includes network interface(s) 440 for communications between computing device or server 400 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
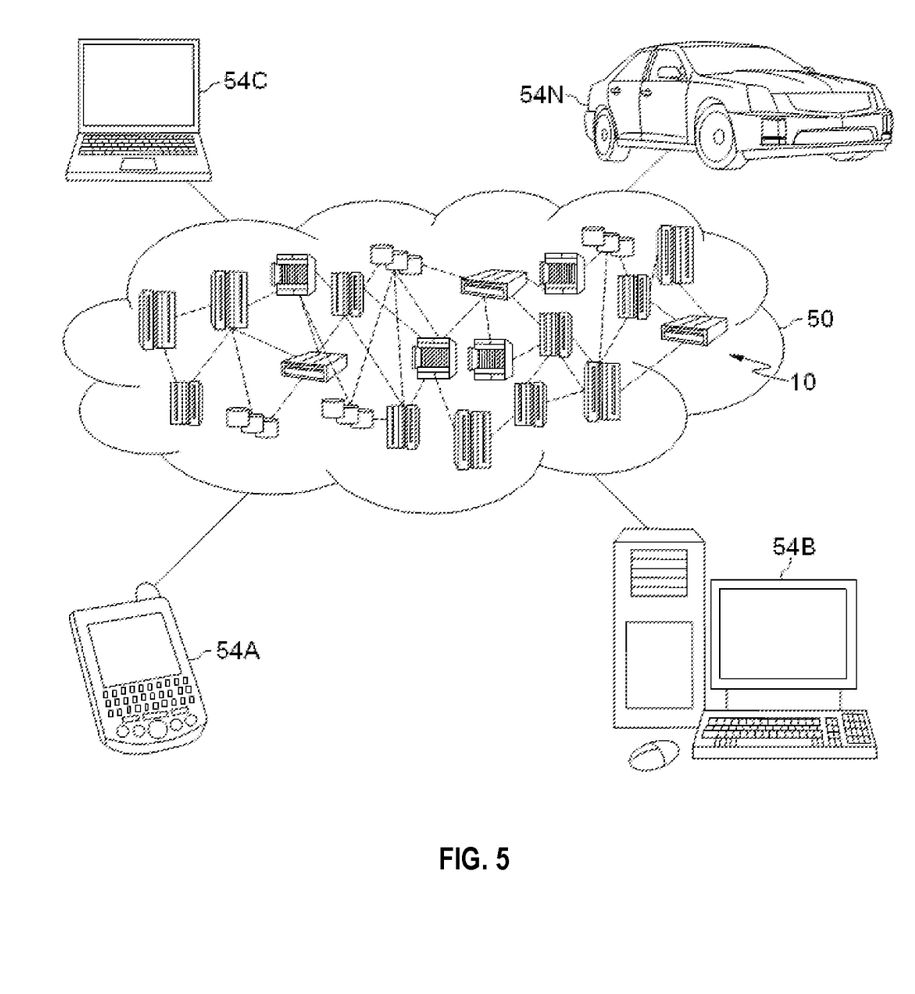
FIG. 5 depicts a cloud computing environment, in accordance with one embodiment of the present invention.

Referring now to FIG. 5, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 6:
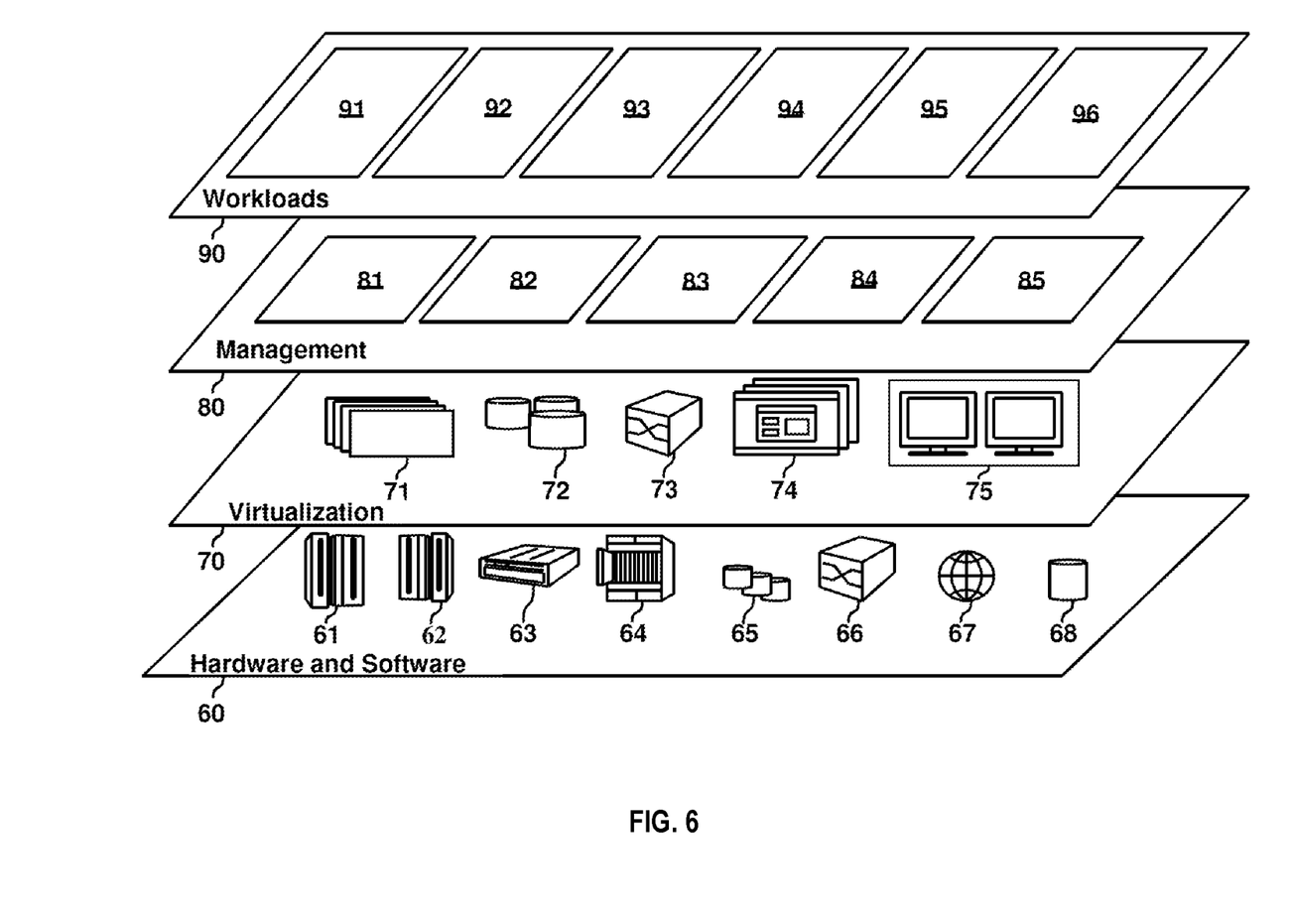
FIG. 6 depicts abstraction model layers in a cloud computing environment, in accordance with one embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of what-if scenario based and generative adversarial network (GAN) generated design adaptation.

What is claimed is:

1. A computer-implemented method for what-if scenario based and generative adversarial network (GAN) generated design adaptation, the method comprising:
   receiving images provided by a user;
   receiving, from a designer, one or more designer provided what-if scenarios for a user interface design that includes the images;
   receiving, from the user, one or more user selected what-if scenarios from the one or more designer provided what-if scenarios;
   retrieving, from an artificial intelligence (AI) knowledge corpus, influencing factors corresponding to the one or more user selected what-if scenarios, wherein the influencing factors are related to image qualities;
   retrieving, from the AI knowledge corpus, user preferences corresponding to the one or more user selected what-if scenarios;
   inputting the user preferences, the images, and the influencing factors into a GAN module;
   changing the images, by the GAN module and based on the input, to generate adapted images for the one or more user selected what-if scenarios; and
   providing adapted user interface designs comprising the one or more user selected what-if scenarios with the adapted images.

2. The computer-implemented method of claim 1, further comprising:
   receiving, from the user, feedback on the adapted user interface designs.

3. The computer-implemented method of claim 2, further comprising:
   in response to determining, based on the feedback, that the user is satisfied with an adapted user interface design from the adapted user interface designs, updating the knowledge corpus with user positive feedback.

4. The computer-implemented method of claim 2, further comprising:
   in response to determining, based on the feedback, that the user is not satisfied with the adapted user interface designs, updating the knowledge corpus with user negative feedback.

5. The computer-implemented method of claim 2, further comprising:
   in response to determining, based on the feedback, that the user is not satisfied with the adapted user interface designs, requesting, from the designer, one or more new what-if scenarios for the user interface design;
   receive, from the designer and in response to the request, one or more designer newly provided what-if scenarios for the user interface design;
   receiving, from the user, one or more user newly selected what-if scenarios from the one or more designer newly provided what-if scenarios; and
   iterating steps of the what-if scenario based and GAN generated design adaptation to generate at least one additional adapted user interface design.

6. The computer-implemented method of claim 2, further comprising:
in response to determining, based on the feedback, that the user is not satisfied with the adapted user interface designs, receiving, from the user, one or more new user selected what-if scenarios from the one or more designer provided what-if scenarios; and
iterating steps of the what-if scenario based and GAN generated design adaptation to generate at least one additional adapted user interface design.

7. A computer program product for what-if scenario based and generative adversarial network (GAN) generated design adaptation, the computer program product comprising a computer readable storage medium having program instructions embodied therewith, the program instructions executable by one or more processors, the program instructions executable to:
receive images provided by a user;
receive, from a designer, one or more designer provided what-if scenarios for a user interface design that includes the images;
receive, from the user, one or more user selected what-if scenarios from the one or more designer provided what-if scenarios;
retrieve, from an artificial intelligence (AI) knowledge corpus, influencing factors corresponding to the one or more user selected what-if scenarios, wherein the influencing factors are related to image qualities;
retrieve, from the AI knowledge corpus, user preferences corresponding to the one or more user selected what-if scenarios;
input the user preferences, the one or more user selected what-if scenarios, the images, and the influencing factors into a GAN module;
change the images, by the GAN module and based on the input, to generate adapted images for the one or more user selected what-if scenarios; and
provide adapted user interface designs comprising the one or more user selected what-if scenarios with the adapted images.

8. The computer program product of claim 7, wherein the program instructions are further executable to:
receive, from the user, feedback on the adapted user interface designs.

9. The computer program product of claim 8, wherein he program instructions are further executable to:
in response to determining, based on the feedback, that the user is satisfied with an adapted user interface design from the adapted user interface designs, update the knowledge corpus with user positive feedback.

10. The computer program product of claim 8, wherein the program instructions are further executable to:
in response to determining, based on the feedback, that the user is not satisfied with the adapted user interface designs, update the knowledge corpus with user negative feedback.

11. The computer program product of claim 8, wherein the program instructions are further executable to:
in response to determining, based on the feedback, that the user is not satisfied with the adapted user interface designs, request, from the designer, one or more new what-if scenarios for the user interface design;
receive, from the designer and in response to the request, one or more designer newly provided what-if scenarios for the user interface design;
receive, from the user, one or more user newly selected what-if scenarios from the one or more designer newly provided what-if scenarios; and
iterate steps of the what-if scenario based and GAN generated design adaptation to generate additional adapted user interface designs until the user is satisfied with one or more of the additional adapted user interface designs.

12. The computer program product of claim 8, wherein the program instructions are further executable to:
in response to determining, based on the feedback, that the user is not satisfied with the adapted user interface designs, obtain, from the user, one or more new user selected what-if scenarios from the one or more designer provided what-if scenarios; and
iterate steps of the what-if scenario based and GAN generated design adaptation to generate additional adapted user interface designs until the user is satisfied with one or more of the additional adapted user interface designs.

13. A computer system for what-if scenario based and generative adversarial network (GAN) generated design adaptation, the computer system comprising one or more processors, one or more computer readable tangible storage devices, and program instructions stored on at least one of the one or more computer readable tangible storage devices for execution by at least one of the one or more processors, the program instructions executable to:
receive images provided by a user;
receive, from a designer, one or more designer provided what-if scenarios for a user interface design that includes the images;
receive, from the user, one or more user selected what-if scenarios from the one or more designer provided what-if scenarios;
retrieve, from an artificial intelligence (AI) knowledge corpus, influencing factors corresponding to the one or more user selected what-if scenarios, wherein the influencing factors are related to image qualities;
retrieve, from the AI knowledge corpus, user preferences corresponding to the one or more user selected what-if scenarios;
input the user preferences, the one or more user selected what-if scenarios, the images, and the influencing factors into a GAN module;
change the images, by the GAN module and based on the input, to generate adapted images for the one or more user selected what-if scenarios; and
provide adapted user interface designs comprising the one or more user selected what-if scenarios with the adapted images.

14. The computer system of claim 13, wherein the program instructions are further executable to:
receive, from the user, feedback on the adapted user interface designs.

15. The computer system of claim 14, wherein the program instructions are further executable to:
in response to determining, based on the feedback, that the user is satisfied with an adapted user interface design from the adapted user interface designs, update the knowledge corpus with user positive feedback.

16. The computer system of claim 14, wherein the program instructions are further executable to:
in response to determining, based on the feedback, that the user is not satisfied with the adapted user interface designs, update the knowledge corpus with user negative feedback.

17. The computer system of claim 14, wherein the program instructions are further executable to:
- in response to determining, based on the feedback, that the user is not satisfied with the adapted user interface designs, request, from the designer, one or more new what-if scenarios for the user interface design;
- receive, from the designer and in response to the request, one or more designer newly provided what-if scenarios for the user interface design;
- receive, from the user, one or more user newly selected what-if scenarios from the one or more designer newly provided what-if scenarios; and
- iterate steps of the what-if scenario based and GAN generated design adaptation to generate additional adapted user interface designs until the user is satisfied with one or more of the additional adapted user interface designs.

18. The computer system of claim 14, wherein the program instructions are further executable to:
- in response to determining, based on the feedback, that the user is not satisfied with the adapted user interface designs, receive, from the user, one or more new user selected what-if scenarios from the one or more designer provided what-if scenarios; and
- iterate steps of the what-if scenario based and GAN generated design adaptation to generate additional adapted user interface designs until the user is satisfied with one or more of the additional adapted user interface designs.

* * * * *